UNITED STATES PATENT OFFICE.

ALFRED CONZETTI, OF BASEL, SWITZERLAND, ASSIGNOR TO ANILINE COLOUR AND EXTRACT WORKS, FORMERLY JOHN R. GEIGY, OF BASEL, SWITZERLAND.

TRIPHENYLMETHANE DYE AND PROCESS OF MAKING SAME.

No. 877,053.     Specification of Letters Patent.     Patented Jan. 21, 1908.

Application filed August 1, 1907. Serial No. 386,624.

*To all whom it may concern:*

Be it known that I, ALFRED CONZETTI, doctor of philosophy, chemist, a citizen of the Swiss Republic, and residing at Basel, Switzerland, have invented certain new and useful Improvements in Mordant-Dyeing Coloring-Matters of the Triphenylmethane Series, of which the following is a specification.

*Triphenylmethane Dye and Process of Making Same.*

My present invention relates to the production of new triphenylmethane dye-stuffs, adapted to be afterwards treated with bichromate, by condensing ortho-chlorobenzaldehyde of the general formula

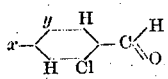

($x$ and $y$ representing hydrogen atoms which can be replaced by halogen, the nitro or sulfo group) for instance: orthochlorobenzaldehyde (CHO:Cl = 1:2) dichlorobenzaldehyde (CHO:Cl:Cl = 1:2:4 and 1:2:5) nitroörthochloro-benzaldehyde (CHO:Cl:NO$_2$ = 1:2:4 and 1:2:5)

sulfoörthochloro-benzaldehyde (CHO:Cl:SO$_3$H = 1:2:4 and 1:2:5)

trichlorobenzaldehyde (CHO:Cl:Cl:Cl = 1:2:4:5)

and the like with aromatic oxycarbonic acids such as ortho-cresotinic acid or salicylic acid and by oxidizing the thus produced leuco compounds in presence of concentrated sulfuric acid by means of nitrous acid or nitric acid.

The following examples will serve to illustrate the manner in which the new coloring matters can be obtained in practice, but my invention is not limited to these examples.

Example I. A mixture of 14.1 kilos of orthochlorobenzaldehyde 150 kilos of concentrated sulfuric acid and 27.6 kilos of salicylic acid is well stirred at a temperature of 15° C. for 4 hours. Then a solution of 7 kilos of nitrite of sodium in 100 kilos of concentrated sulfuric acid is poured into it and heated within 4 hours to 90–100° C. The formation of coloring matter will commence at 40° C. and is finished after two hours more stirring at 90–100° C. The deep red melt is then poured into water and the resulting precipitate is filtered off, washed and dried. The dyestuff, a brick colored powder, is insoluble in water, soluble in soda with bluish red and in alkali with reddish-violet-hue. When dyed in an acidulated bath, the dyestuff goes on the wool as an almost colorless carbinol and turns as full violet blue only after being chromed.

Example II. 18.5 kilos of 2-chloro-5-nitrobenzaldehyde and 30.4 kilos of orthocresotinic acid are condensed while stirring with 200 kilos of concentrated sulfuric acid at a temperature of 60° C. and oxidized by means of 14 kilos of a mixture of nitric and sulfuric acid (containing 45% HNO$_3$) under formation of nitrous oxids. After stirring for another 2 hours at the same temperature the melt is poured into water and filtered off. The coloring matter is a red powder, insoluble in water, soluble in soda with a slightly brownish-red, in alkali with bluish violet tint which by the liberal addition of alkali will, while forming flakes, turn a pure blue. The dyeings on wool in an acidulated bath will yield shades of a slight yellowish-red only which by after treatment with bichromate of potassium, changes into a brilliant and pure greenish blue. The same greenish blue shades are produced by dyeing chrome mordanted wool. The new dyestuffs can also be used for printing on cotton when mixed with a chrome salt. The chromed dyeings excel in very good fastness to milling as well as in fastness to light hitherto unknown with colors of the triphenylmethane-range.

Having now described my invention what I claim is—

1. The process for the production of coloring matters of the triphenylmethane series by condensing the hereinbefore defined orthochloro-benzaldehydes in presence of concentrated sulfuric acid with aromatic orthooxycarbonic acids and by subsequently oxidizing the thus produced leuco compounds by means of a solution of sodium nitrite in concentrated sulfuric acid.

2. The process for the production of coloring matters of the triphenylmethane series by condensing the hereinbefore defined orthochloro-benzaldehydes in presence of concentrated sulfuric acid with orthocresotinic acid and by subsequently oxidizing the thus produced leuco compounds by means of nitrosylsulfuric acid.

3. The process for the production of coloring matters of the triphenylmethane series by condensing the hereinbefore defined orthochloro-benzaldehydes in presence of concentrated sulfuric acid with orthocresotinic acid and by subsequently oxidizing the thus produced leuco compounds by means of a mixture of nitric and sulfuric acid.

4. As new articles of manufacture the coloring matters obtainable as described from the hereinbefore defined orthochloro-benzaldehydes and aromatic orthoöxy carbonic acids which dyestuffs are in the shape of their free carbonic acids from orange red to dark bronzelike powder, soluble in diluted caustic soda lye with a violet color, dyeing wool slight yellowish red which shades by aftertreatment with bichromate change into a brilliant blue, and yielding the same blue shades when printed on cotton with a chrome salt.

5. As new article of manufacture the coloring matter obtainable as described from the 5-nitro-orthochloro-benzaldehyde and orthocresotinic acid, which dyestuff is in the shape of its free carbonic acid a red powder, insoluble in water, soluble in diluted caustic soda lye with a bluish violet color, dyeing wool from acid bath slight yellowish red which shades by aftertreatment with bichromate change into a brilliant greenish blue, and yielding the same greenish blue shades when printed on cotton with a chrome salt.

In testimony whereof I have signed this specification in the presence of two subscribing witnesses.

ALFRED CONZETTI.

Witnesses:
GEO. GIFFORD,
CHARLES KOECHLIN.